United States Patent [19]

Greenwood

[11] 4,036,097

[45] July 19, 1977

[54] PIN FASTENER

[76] Inventor: Donald L. Greenwood, Rte. 2, Box 19A, Akron, Iowa 51001

[21] Appl. No.: 690,468

[22] Filed: May 27, 1976

[51] Int. Cl.² .............................................. F16B 21/18
[52] U.S. Cl. ...................................... 85/5 CP; 85/8.3
[58] Field of Search ............. 85/5 CP, 5 M, 5 N, 8.3, 85/8.1, 7; 403/315, 316, 317, 318; 24/201 LP, 178 R, 188; 238/250–253

[56] References Cited

U.S. PATENT DOCUMENTS

| | | |
|---|---|---|
| 2,759,388 | 8/1956 | Annis ................................... 85/5 CP |
| 2,856,806 | 10/1958 | Gibbons ............................... 85/5 CP |
| 3,289,521 | 12/1966 | Van Sloun ............................... 85/8.1 |
| 3,926,089 | 12/1975 | Ruehig ................................. 85/5 CP |

Primary Examiner—Marion Parsons, Jr.
Attorney, Agent, or Firm—Henderson, Strom & Sturm

[57] ABSTRACT

An improved pin fastener for securing a shaft to a bushing wherein the shaft has a hole formed diametrally therethrough proximate one end thereof, the fastener including a head integral with a shank and a snap ring movably and pivotally secured to the head and coactable with the shank to secure the fastener to the shaft.

5 Claims, 5 Drawing Figures

PIN FASTENER

BACKGROUND OF THE INVENTION

This invention relates to the fastening device and to secure a farm implement or the like to a tractor or the like. A typical hitch unit includes a bushing member on the tractor, a shaft member on the implement, and a hitch pin which is coactable with the shaft member to lock the latter to the bushing member. As a tractor, under normal operations, is subjected to rough ground as it traverses a field, the hitch pin is dislodged from the shaft and the implement separates from the tractor. To overcome this disadvantage, hitch pins have been developed wherein a ring is secured off-center to the hitch pin and thereby closes against the pin in a position to discourage disengagement of the pin from the shaft. However, if there is any upstanding grain, weeds or foreign objects on the field, the ring becomes dislodged and the pin may jiggle out of its position relative to the shaft.

Other pins have been developed wherein a wire or spring is secured to the ring of the pin which coacts with the shank end of the pin to lock it to the shaft. These pins, however, take considerable abuse and break or are lost, thus any additional elements only increase the cost of replacement. Secondly, the ease of installation is affected and time is lost in engaging and disengaging the pin.

SUMMARY OF THE INVENTION

An improved pin fastener for securing a shaft to a bushing or the like and having a spring biased clip ring movably and pivotally secured to the head of a hitch with a notch formed in the shank end thereof for receiving the clip ring in a locked position. The ring is movable against the bias of the spring to disengage the ring from the notch to permit it to be pivoted to an open position.

An object of this invention is to provide an improved pin fastener for detachably securing a bushing member and a shaft member together which is extremely effective in use, economical of manufacture and simple but rugged in construction.

Another object of the present invention is to provide a pin fastener which can easily be locked to the shaft member, which cannot be easily dislodged by foreign object, but which can readily be unlocked and easily removed from engagement with the shaft member.

Other objects, advantages, and novel features of this invention will become apparent from the following detailed description of the invention when considered in conjunction with the accompanying drawings.

DESCRIPTION OF THE PREFERRED EMBODIMENT

Figure 1:
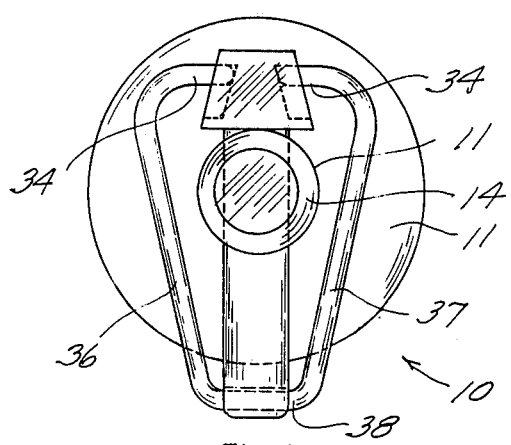
FIG. 1 is an end elevational view of the pin fastener of this invention as it coacts with a shaft member and a bushing member.

Referring to the drawings, FIG. 1 depicts the pin fastener of this invention, generally at 10, detachably secured to a shaft member 11. The shaft member 11 (FIGS. 1 and 2), normally secured to a farm implement (not shown) or the like, is slidably mounted in an opening 12 formed axially through a bushing member 13 or the like, and the bushing member 13 would normally be secured to a tractor (not shown) or the like.

The periphery of the free end 14 of the shaft member is beveled to readily permit insertion of the shaft member into and through the opening 12 in the bushing member 13. Diametrally formed through the shaft member 11 (FIG. 2) proximate the free end thereof is a hole 16.

Figure 3:
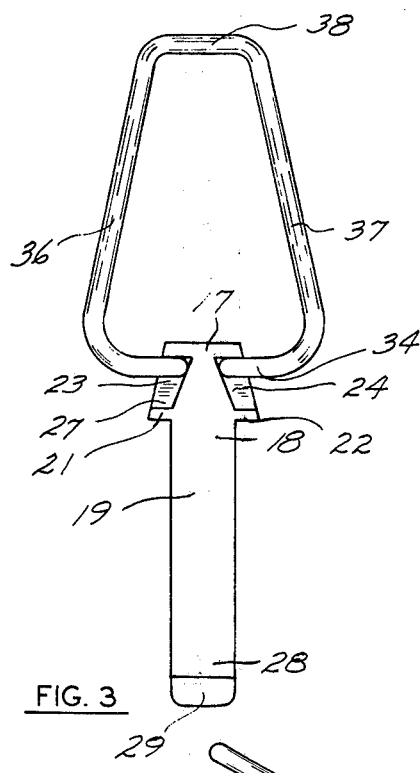
FIG. 3 is a sectional view of the pin fastener in an unlocked position taken along the lines 3—3 in FIG. 2.

The pin fastener 10 (FIGS. 3 and 5) includes a head 17 integral with one end 18 of an elongated cylindrical shank 19. The head 17 has a pair of free ends 21 and 22, each of which projects radially and equally from opposite sides of the shank 19, thereby forming in combination with the shank, a modified T in front elevational view. Each free end of the head 17 has an elongated canted slot 23 or 24 formed therein wherein the slot is angularly disposed relative to the longitudinally axis of the shank. The slots are disposed opposite each other with the upper ends 26 of the slots being closer together than the lower ends 27 for a purpose hereinafter described. The free end 28 of the shank 19 is beveled and a notch 29 is formed diametrally therein.

Figure 2:
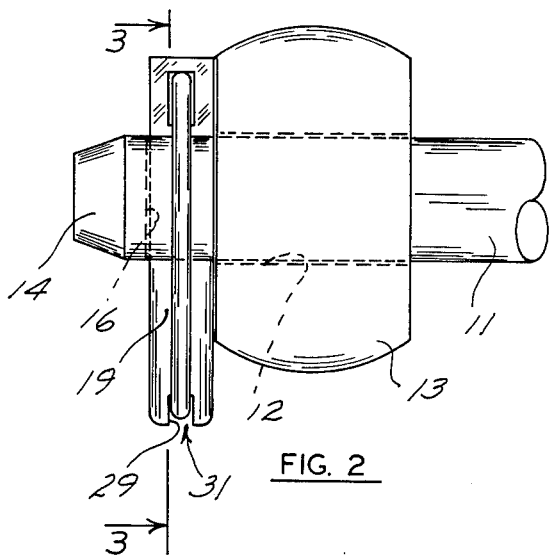
FIG. 2 is a side elevational view thereof.
Figure 4:
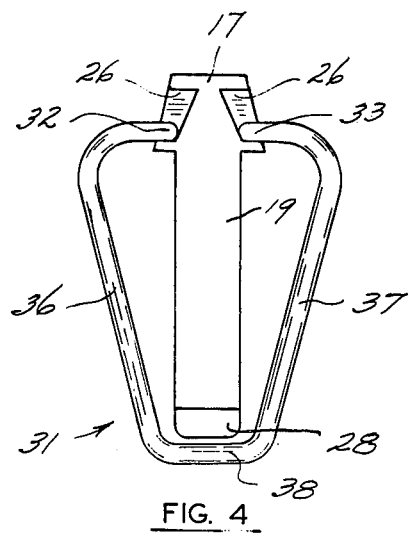
FIG. 4 is a sectional view of the pin fastener in a locked position taken along the lines 3—3 in FIG. 2.
Figure 5:
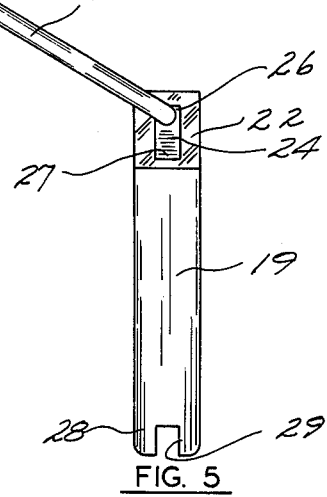
FIG. 5 is a side elevational view of the pin fastener in an unlocked position.

Removably and pivotally mounted in slots 23 and 24 is a snap ring 31 (FIGS. 4 and 5). The ring 31 is formed from an elongated, generally cylindrical, spring steel wire. The wire is bent or formed into a modified eliptical or triangular shape with the two ends 32 and 33 forming the top element 34 and substantially touching at the midpoint thereof. The side elements 36 and 37 of the ring extend from the top element 34 and tend to converge wherein they join the bottom element 38 which is generally parallel to the top element 34. The distance between the top and bottom elements 34 and 38 is generally equal to the distance between the upper ends 26 of the slots 23 and 24 and the base of the notch 29. The ring 31 is mounted on the head 17 by forcing the ends 32 and 33 apart against the base of the spring and then depositing them in the slots 23 and 24. The bias in the ring will cause the ends to seat in the upper ends of the slots 23 and 24 and the bottom element 38 will thus seat in the notch 29. To disengage the bottom element 38 from the notch 29, one of the side elements is grasped and pulled toward the bottom element. The spring of the wire permits the ends 32 and 33 to move further apart as they are forced to the lower end of the slots 23 and 24. Upon disengagement of the bottom element 38 from the notch 29, the ring can be pivoted to a position disposed above the head (FIG. 3) and shank 19 is then clear to permit its insertion into the hole 16 in the shaft 11. The ring is then pivoted and moved against the bias of the spring to permit placement of the bottom element in the notch (FIG. 2).

The profile of the ring relative to the shaft and bushing presents very little of the ring to foreign objects thus the ring will not easily become disengaged from the shank notch nor can the shank be easily disengaged from the shaft because of the locking feature of the ring in the notch.

I claim:

1. A pin fastener for locking a bushing member on a shaft member, the shaft member having a hole formed diametrally therein proximate one end thereof, the pin fastener comprising:

an elongated pin having a head connected to one end of a shank, said shank free end having a notch formed diametrally there across and said head having a pair of elongated canted slots formed therein opposite each other with said slots being generally longitudinally disposed relative to the axis of said pin with the upper ends thereof distal said shank being closer together than the lower ends nearest said shank; and a snap ring having an open section formed therein for providing a pair of ends with said ends pivotably and movably disposed in said slots, said ring movable from a first position with said ends disposed in said upper ends of said slots and said ring disposed in said notch to a second position with said ends disposed in said lower ends of said slots and said ring disposed distal of said notch.

2. A pin fastener as defined in claim 1 wherein said ring is formed of spring steel and movement of said ring from said first position to said second position is against the bias of the spring thereof.

3. A pin fastener as defined in claim 1 wherein the periphery of said shank's free end is beveled to permit said ring to slide into said notch.

4. A pin fastener as defined in claim 3 wherein said ring is formed of spring steel.

5. A pin fastener as defined in claim 4 wherein said head has a pair of free ends each of which project radially and equally from opposite sides of said shank and said slots are formed in said free ends.

* * * * *